United States Patent
Doerr (12)

(10) Patent No.: US 6,172,781 B1
(45) Date of Patent: Jan. 9, 2001

(54) WAVE DIVISION MULTIPLEXED OPTICAL NETWORK

(75) Inventor: Christopher Richard Doerr, Middletown, NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/040,748

(22) Filed: Mar. 18, 1998

(51) Int. Cl.[7] .................................................. H04J 14/02
(52) U.S. Cl. ........................ 359/124; 359/133; 359/124
(58) Field of Search ...................................... 359/124, 133

(56) References Cited

U.S. PATENT DOCUMENTS 5,946,119 * 8/1999 Bergano et al. .................... 359/124

OTHER PUBLICATIONS

L.F. Mollenauer et al. "Solitons in High Bit–Rate Long–Distance Transmission" Optical Fiber Telecommunications III A Academic Press, San Diego, 1997, pp. 438–439.

* cited by examiner

Primary Examiner—Jason Chan
Assistant Examiner—Vu Lieu

(57) ABSTRACT

A wavelength division multiplexed optical system utilizes a plurality of lasers each operating at a different wavelength. Each laser is directly modulated with independent data at an NRZ signal of a given bit rate frequency and their outputs are combined as a train of pulses in a single optical fiber in the WDM format. The train of pulses is passed through a Mach-Zehender modulator driven with a sine wave synchronized with the bit rate of the NRZ drive to the lasers.

6 Claims, 1 Drawing Sheet

WAVE DIVISION MULTIPLEXED OPTICAL NETWORK

FIELD OF THE INVENTION

This invention relates to optical transmission systems.

BACKGROUND OF THE INVENTION

Optical transmission systems in which optical pulses are transmitted over optical fibers, typically of low loss silica, are becoming of increasing importance. Generally these systems use wavelength division multiplexing (WDM) to increase the channel capacity of transmission thereby to reduce the unit cost per channel.

The lowest cost transmitters for WDM networks presently are directly modulated lasers, for example distributed feedback (DFB) lasers. However, the pulses produced by such lasers are generally characterized by chromatic dispersion in that the leading edge of the pulse typically includes frequency components that are changing from high to low whereas the trailing edge typically includes frequency components that are changing from low to high. Such pulses when transmitted over an optical fiber experience a phenomenon described as chirping, which leads to a reduction in the distance a train of closely spaced pulses can be transmitted without overlap between pulses. Such overlap impairs the fidelity of transmission and the recovery of the signal information at the receiver.

One technique that has been used to improve the quality of pulses from a directly modulated laser has been to pass the pulses through a narrow pass band filter to remove these unwanted frequencies at the leading and trailing edges of the pulses. However, in a WDM system using many channels of different wavelengths, this approach requires a separate filter for each channel and adds to the complexity and cost of the system.

Additionally, it has been known that following a non-return-to-zero (NRZ) electro-absorption modulator with a soliton pulse shaper attenuates the regions of highest transient chromatic dispersion generated by the NRZ modulator for soliton transmission systems. However, such a scheme has not previously been proposed for attenuating the region of highest chromatic dispersion in directly modulated lasers.

SUMMARY OF THE INVENTION

The present invention, in one aspect, is a method for increasing the effective distance a train of optical pulses from directly modulated lasers can be transmitted in WDM networks. Basically, the method involves providing a plurality of lasers, each modulated at a different wavelength independently as a separate channel but at the same bit rate in an NRZ format. The separate pulse trains are then multiplexed on the same optical fiber in the usual WDM fashion. The combined pulse train is then passed through a narrow-band amplitude modulator that is driven with a sine wave at the bit rate frequency and timed for transforming each channel from the NRZ format to a return-to-zero format. Moreover, in the process there are attenuated the portions of each pulse corresponding to the leading and trailing edges, effectively narrowing each pulse and removing the portions most vulnerable to phase dispersion as the pulses move along the optical fiber to the receiving station.

In accordance with another aspect, the invention is a WDM network that comprises at the transmitting end a plurality of optical lasers each tuned to a different wavelength for providing a plurality of different wavelength channels. Separate modulators impress independent data in each channel but all at the same bit rate and the separate channels are then routed onto a single optical fiber. The optical fiber is connected to a suitable narrow-band modulator-attenuator, for example, a March-Zehender modulator driven in a push-pull configuration with a 2.5 GHz sine wave synchronized with the NRZ drive to the lasers. Moreover, the sine wave is synchronized so that the peak of the sine wave coincides essentially with the center of the optical pulse. The modulator-attenuator serves both to convert the NRZ pulse format to the return-to-zero pulse format, while attenuating substantially the leading and trailing portions of the pulses, the portions most vulnerable to the chromatic dispersion that distorts the shape of the pulses during transmission along the fiber.

BRIEF DESCRIPTION OF THE DRAWING

The single FIGURE shows the transmitting end of a WDM optical network illustrative of the invention.

DETAILED DESCRIPTION

Figure 1:
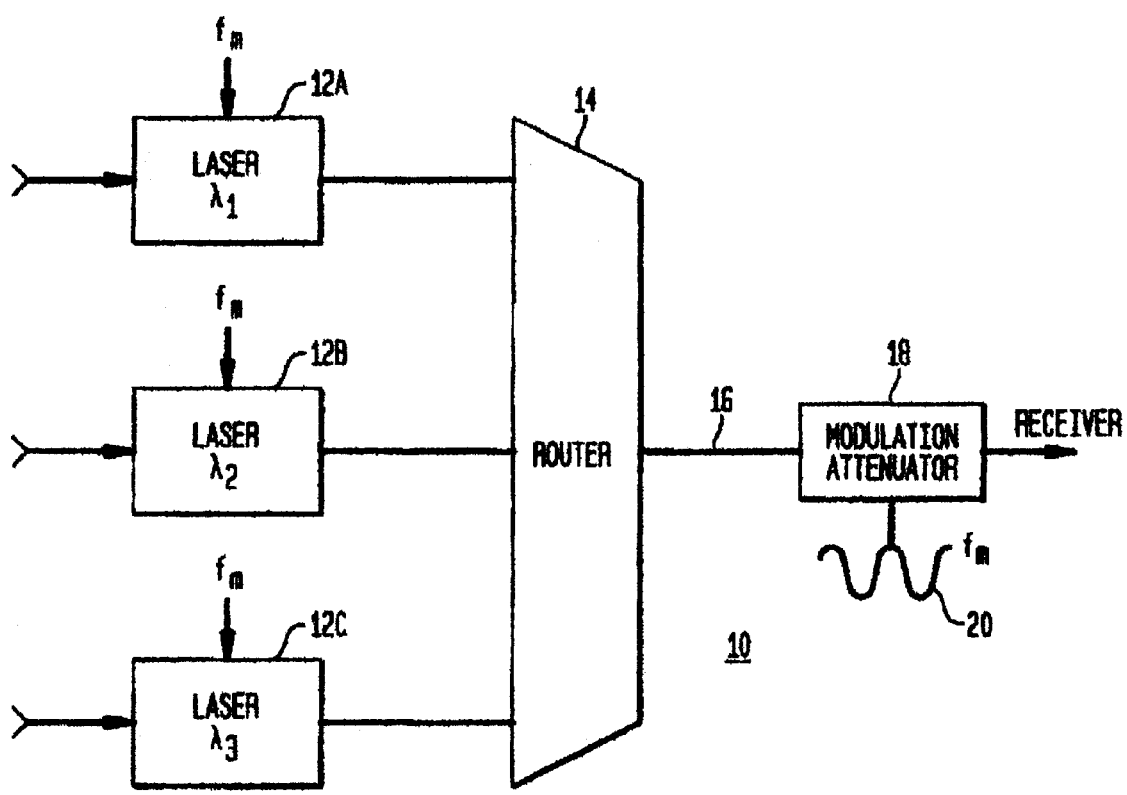

The FIGURE shows in block schematic form the basic components of the transmitting end 10 of a WDM network in accordance with the invention. A plurality of lasers of the directly modulated type, typically distributed feedback semiconductor lasers, 12A, 12B, 12C, each tuned to a different wavelength $\lambda_1$, $\lambda_2$, $\lambda_3$, respectively, are separately modulated with independent data, but at the same bit rate $f_m$, for example 2.5 GHz, in any suitable manner to provide a train of amplitude-modulated optical pulses in the NRZ format.

The separate trains of pulses are supplied to an optical router 14, of any suitable type for combining the pulses, appropriately synchronized for superposition, on a single optical fiber 16 in the manner characteristic of a WDM network.

The optical fiber transmits the pulses to a suitable amplitude modulator-attenuator 18, for example, a Mach-Zehender type, that is driven with a sine wave whose frequency is that of the bit rate $f_m$, transferring each channel from NRZ to return-to-zero format.

Each channel's synchronization with the bit data can be done in any convenient fashion, typically with electrical delay, so that the peak of the sine wave corresponds to about the center of each pulse, whereby there are attenuated the leading and trailing portions of each pulse, the portions particularly vulnerable to phase dispersion, when the pulses are transmitted long distances over an optical fiber. Since the outgoing pulses are narrowed, they are able to travel longer distances before significant overlap with adjacent pulses. The modulator-attenuator may be viewed as a shutter permitting only the narrowed peak portions of each pulse to be transmitted. Since this technique is relatively independent of the optical wavelength of the pulses, the shaping can be done on the multiplexed train of pulses in a single modulator-attenuator rather than on the separate trains in individual modulator-attenuators before multiplexing.

Because the pulses remain well separated, it becomes feasible to amplify the multiplexed train directly by optical amplifiers, such as sections of erbium-doped optical fibers.

It can be appreciated that the principles of the invention are applicable to the transmission of a multiplexed train of pulses of different wavelengths over any form of transmission path in which the pulses are vulnerable to phase dispersion that results in widening of the pulses. Similarly it should be obvious that the principles are not heavily dependent on the specific form of laser or modulator-attenuator, or the bit rate described.

It can be appreciated that the separate pulse trains initially formed can also be interleaved, for example to form a combined pulse train whose bit rate is a multiple of the bit rate of an individual pulse train in which case it would be necessary to use in the modulator-attenuator the multiplied bit rate.

What is claimed:

1. A method for transmitting optical pulses in a wave division multiplexed format comprising:

applying independent modulating signals all at the same bit rate to a plurality of lasers, each radiating at a different wavelength, for creating a plurality of pulse trains, each train at a different wavelength but having the same bit rate;

combining the plurality of pulse trains in a single transmission path; and passing the combined pulses through an attenuator is modulated with a sine wave at the bit rate frequency.

2. The method of claim 1 in which the attenuator is modulated with a sine wave at the bit rate frequency.

3. The method of claim 2 in which the plurality of pulse train are combined, superposed, in a common optical fiber and after trimming the combined pulse train continues on a common optical fiber.

4. The method of claim 3 in which the lasers are semiconductor laser of the distributed feedback type providing pulses in an NRZ format.

5. An optical transmission system in which the transmitting end comprises:

a plurality of lasers each for operating at a different wavelength and adapted to be supplied with data independently for transmission;

means for amplitude modulating each of said lasers at the same bit rate for creating from each an individual train of pulses of a different specific wavelength but common bit rate;

means for combining the individual train of pulses into a single wavelength-division multiplexed train in a common transmission path; and means receiving the wavelength-division multiplexed train for sharpening the individual pulses of the combined train by trimming the leading and trailing portions of each pulses and providing a train of sharpened wavelength-division multiplexed pulses for transmission along a common transmission path.

6. An optical transmission system in accordance with claim 5 in which each laser is a distribute-feedback laser, and the common transmission paths are optical fibers.

* * * * *